(12) United States Patent
Cao et al.

(10) Patent No.: US 8,874,423 B2
(45) Date of Patent: Oct. 28, 2014

(54) MODEL-BASED SCANNER TUNING SYSTEMS AND METHODS

(71) Applicant: ASML Netherlands B. V., Veldhoven (NL)

(72) Inventors: Yu Cao, Saratoga, CA (US); Wenjin Shao, Sunnyvale, CA (US); Ronaldus Johannes Gijsbertus Goossens, Los Altos, AZ (US); Jun Ye, Palo Alto, CA (US); James Patrick Koonmen, Santa Clara, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 14/064,917

(22) Filed: Oct. 28, 2013

(65) Prior Publication Data

US 2014/0046646 A1 Feb. 13, 2014

Related U.S. Application Data

(62) Division of application No. 12/475,080, filed on May 29, 2009, now Pat. No. 8,571,845.

(60) Provisional application No. 61/142,305, filed on Jan. 2, 2009, provisional application No. 61/141,578, filed on Dec. 30, 2008, provisional application No. 61/058,511, filed on Jun. 3, 2008, provisional application No. 61/058,520, filed on Jun. 3, 2008.

(51) Int. Cl.
*G06F 17/50* (2006.01)
*G03F 7/20* (2006.01)

(52) U.S. Cl.
CPC ............... *G06F 17/50* (2013.01); *G03F 7/705* (2013.01); *G03F 7/70525* (2013.01); *G03F 7/70458* (2013.01); *G03F 7/70091* (2013.01); *G03F 7/70516* (2013.01)
USPC ............................................................ 703/13

(58) Field of Classification Search
None
See application file for complete search history.

(56) References Cited

U.S. PATENT DOCUMENTS 5,969,441 A 10/1999 Loopstra et al.
6,046,792 A 4/2000 Van der Werf et al.
(Continued)

FOREIGN PATENT DOCUMENTS

EP 1 560 073 8/2005
EP 1 696 269 8/2006
(Continued)

OTHER PUBLICATIONS

International Search Report issued Nov. 12, 2009 in corresponding PCT/US09/045729.
(Continued)

*Primary Examiner* — Omar Fernandez Rivas
*Assistant Examiner* — Herng-Der Day
(74) *Attorney, Agent, or Firm* — Pillsbury Winthrop Shaw Pittman LLP

(57) ABSTRACT

Systems and methods for tuning photolithographic processes are described. A model of a target scanner is maintained defining sensitivity of the target scanner with reference to a set of tunable parameters. A differential model represents deviations of the target scanner from the reference. The target scanner may be tuned based on the settings of the reference scanner and the differential model. Performance of a family of related scanners may be characterized relative to the performance of a reference scanner. Differential models may include information such as parametric offsets and other differences that may be used to simulate the difference in imaging behavior.

26 Claims, 12 Drawing Sheets

(56) References Cited

U.S. PATENT DOCUMENTS

| | | |
|---|---|---|
| 7,003,758 B2 | 2/2006 | Ye et al. |
| 7,242,459 B2 | 7/2007 | Shi et al. |
| 7,245,356 B2 | 7/2007 | Hansen |
| 7,376,543 B2 | 5/2008 | Zinn |
| 7,488,933 B2 | 2/2009 | Ye et al. |
| 7,587,704 B2 | 9/2009 | Ye et al. |
| 7,617,477 B2 | 11/2009 | Ye et al. |
| 7,653,890 B2 * | 1/2010 | Tsai et al. ............... 716/55 |
| 7,925,090 B2 | 4/2011 | Kotani et al. |
| 7,999,920 B2 | 8/2011 | Ye et al. |
| 8,571,845 B2 | 10/2013 | Cao et al. |
| 2003/0236653 A1 | 12/2003 | Zinn et al. |
| 2007/0002311 A1 | 1/2007 | Park et al. |
| 2007/0031745 A1 | 2/2007 | Ye et al. |
| 2007/0061773 A1 | 3/2007 | Ye et al. |
| 2007/0130560 A1 | 6/2007 | Kotani et al. |
| 2009/0300561 A1 | 12/2009 | Tong et al. |
| 2010/0010784 A1 | 1/2010 | Cao et al. |

FOREIGN PATENT DOCUMENTS

| | | |
|---|---|---|
| EP | 2 028 546 | 2/2009 |
| JP | 2002-174890 | 6/2002 |
| JP | 2002-175969 | 6/2002 |
| JP | 2002-353104 | 12/2002 |
| JP | 2004-031962 | 1/2004 |
| JP | 2004-103674 | 4/2004 |
| JP | 2004-246223 | 9/2004 |
| JP | 2006-235600 | 9/2006 |
| JP | 2006-235607 | 9/2006 |
| JP | 2008-053565 | 3/2008 |
| JP | 2008-205131 | 9/2008 |
| JP | 2009-505400 | 2/2009 |
| JP | 5225462 | 7/2013 |
| WO | 2007/019269 | 2/2007 |
| WO | 2007/030704 | 3/2007 |
| WO | 2009/148972 | 12/2009 |
| WO | 2009/148974 | 12/2009 |

OTHER PUBLICATIONS

Shih, et al., "Model Based Scanner Turning in a Manufacturing Environment", Proc. of SPIE—Optical Microlithography XXII 2009 SPIE USA, vol. 7274, 2009 7 pages.

Hunsche, et al., "Improved Model Predictability by Machine Data in Computational Lithography and Application to Laser Bandwidth Tuning", Proc. of SPIE—Optical Microlithography XXII 2009 SPIE USA, vol. 7274, 11 pages.

International Search Report issued Nov. 9, 2009 in corresponding PCT/US09/045726.

Nojima, et al., "Accurate Model Base Verification Scheme to Eliminate Hotspots and Manage Warmspots,", Proc. SPIE, vol. 6925, (2008), pp. 1-8.

Yoshida, et al. "Scanner Fleet Management Utilizing Programmed Hotspot Patterns", Proc. SPIE, vol. 7028, (2008)., pp. 1-12.

U.S. Office Action mailed Aug. 10, 2012 in corresponding U.S. Appl. No. 12/475,095.

Japanese Office Action mailed Jul. 2, 2012 in corresponding Japanese Patent Application No. 2011-512549.

Japanese Office Action mailed Jun. 18, 2012 in corresponding Japanese Patent Application No. 2011-512550.

* cited by examiner

MODEL-BASED SCANNER TUNING SYSTEMS AND METHODS

CROSS-REFERENCE TO RELATED APPLICATIONS

This application is a divisional of U.S. patent application Ser. No. 12/475,080, filed May 29, 2009, now U.S. Pat. No. 8,571,845, which claims priority from U.S. Provisional Patent Application No. 61/141,578 filed Dec. 30, 2008 and from U.S. Provisional Patent Application No. 61/142,305 filed Jan. 2, 2009, and from U.S. Provisional Patent Application No. 61/058,511 filed Jun. 3, 2008, and from U.S. Provisional Patent Application No. 61/058,520 filed Jun. 3, 2008, which applications are expressly incorporated by reference herein in their entirety.

BACKGROUND OF THE INVENTION

1. Field of the Invention

The present invention relates generally to systems and methods for performing model-based scanner tuning and optimization and more particularly to optimization of performance of multiple lithography systems.

2. Description of Related Art

Lithographic apparatus can be used in the manufacture of integrated circuits (ICs). A mask contains a circuit pattern corresponding to an individual layer of the IC, and this pattern is imaged onto a target portion comprising one or more dies on a substrate of silicon wafer that has been coated with a layer of radiation-sensitive resist material. In general, a single wafer will contain a network of adjacent target portions that are successively irradiated via the projection system, one at a time. In one type of lithographic projection apparatus, commonly referred to as a wafer stepper, each target portion is irradiated by exposing the entire mask pattern onto the target portion in one pass. In s step and scan apparatus, each target portion is irradiated by progressively scanning the mask pattern under the projection beam in a given reference or "scanning direction" while synchronously scanning the substrate table parallel or anti parallel to this direction. In a projection system having a magnification factor M (generally <1), the speed Vat which the substrate table is scanned will be a factor M times that at which the mask table is scanned. More information with regard to lithographic devices as described herein can be gleaned, for example, from U.S. Pat. No. 6,046,792, incorporated herein by reference.

In a manufacturing process using a lithographic projection apparatus, a mask pattern is imaged onto a substrate that is at least partially covered by a layer of radiation sensitive resist material. Prior to this imaging step, the substrate may undergo various procedures, such as priming, resist coating and soft bake. After exposure, the substrate may be subjected to other procedures, such as a post exposure bake (PEB), development, a hard bake and measurement/inspection of the imaged features. This array of procedures is used as a basis to pattern an individual layer of a device, e.g., an IC. Such a patterned layer may then undergo various processes such as etching, ion implantation or doping, metallization, oxidation, chemo mechanical polishing, etc. to finish an individual layer. If several layers are required, then the procedure, or a variant thereof, will have to be repeated for each new layer. Eventually, an array of devices will be present on the substrate wafer. These devices are then separated from one another by a technique such as dicing or sawing and the individual devices can be mounted on a carrier, connected to pins, etc.

A projection system (hereinafter the "lens") encompasses various types of projection systems, including, for example refractive optics, reflective optics, and catadioptric systems and may include one or more lens. The lens may also include components of a radiation system used for directing, shaping or controlling the projection beam of radiation. Further, the lithographic apparatus may be of a type having two or more substrate tables and/or two or more mask tables. In such multiple stage devices the additional tables may be used in parallel and/or preparatory steps may be carried out certain tables while other tables are used for exposure. Twin stage lithographic apparatus are described, for example, in U.S. Pat. No. 5,969,441, incorporated herein by reference.

The photolithographic masks referred to above comprise geometric patterns corresponding to the circuit components to be integrated onto a silicon wafer. The patterns used to create such masks are generated utilizing computer-aided design ("CAD") programs, this process often being referred to as electronic design automation ("EDA"). Most CAD programs follow a set of predetermined design rules in order to create functional masks. These rules are set by processing and design limitations. For example, design rules define the space tolerance between circuit devices such as gates, capacitors, etc. or interconnect lines, so as to ensure that the circuit devices or lines do not interact with one another in an undesirable way. The design rule limitations are typically referred to as critical dimensions ("CDs"). A CD of a circuit can be defined as the smallest width of a line or hole or the smallest space between two lines or two holes. Thus, the CD determines the overall size and density of the designed circuit. Of course, one of the goals in integrated circuit fabrication is to faithfully reproduce the original circuit design on the wafer via the mask.

Generally, benefit may accrue from utilizing a common process for imaging a given pattern with different types of lithography systems, such as scanners, without having to expend considerable amounts of time and resources determining the necessary settings of each lithography system to achieve optimal/acceptable imaging performance. Designers and engineers can spend a considerable amount of time and money determining optimal settings of a lithography system which include numerical aperture ("NA"), $\sigma_{in}$, $\sigma_{out}$, etc., when initially setting up a process for a particular scanner and to obtain images that satisfy predefined design requirements. Often, a trial and error process is employed wherein the scanner settings are selected and the desired patterns are imaged and then measured to determine if the output images fall within specified tolerances. If the output images are out of tolerance, the scanner settings are adjusted and the patterns are imaged once again and measured. This process is repeated until the resulting images are within the specified tolerances.

However, an actual pattern imaged on a substrate can vary from scanner to scanner due to the different optical proximity effects ("OPEs") exhibited by different scanners when imaging a pattern, even when the scanners are of identical model types. For example, different OPEs associated with certain scanners can introduce significant CD variations through pitch. Consequently, it is often impossible to switch between scanners and obtain identical imaged patterns. Thus, engineers must optimize or tune a scanner when that scanner is new or different and is to be used to print a pattern with the expectation of obtaining resulting images that satisfy the design requirements. Currently, an expensive, time-consuming trial and error process is used to adjust processes and scanners.

In the current state of the art, a common form of scanner tuning is proximity matching. The goal is to match printed wafer CDs for a set of predefined patterns between a tunable scanner and a reference scanner. Typically the emphasis is on one dimensional patterns ("1D patterns") through pitch, as the critical dimension uniformity for those patterns is most critical for semiconductor device performance. The predefined patterns are exposed on wafer using the reference scanner and the tunable seamier, and wafer CD values are measured. The differences in CD are used to drive tuning offsets on the tunable scanner, in order to match the CD values after tuning to those from the reference scanner. Optimization is performed in a linear fashion, assuming a linear dependency of CD values relative to tuning offsets. The linear dependency is characterized by sensitivities, defined as partial derivatives of CD values to knob offsets. The sensitivities may be measured or simulated from a lithography model, such as one provided by U.S. Pat. No. 7,003,758.

There are a few shortcomings of the existing methodology, which the current invention seeks to overcome. First, every pattern to be matched must be measured, which is not the most efficient use of the wafer metrology time in the fab (usually in high demand). Conversely, there is no claim to the level of matching or imaging behavior for patterns other than those measured. This is known to have caused problems in production environments, where a set of 1D patterns are matched sufficiently well, but some two-dimensional ("2D") real device patterns had demonstrably mismatched results in the wafer imaging after tuning. See, "Accurate Model Base Verification Scheme To Eliminate Hotspots And Manage Wannspots," Proc. SPIE, Vol. 6925, 69250Z (2008) and "Scanner Fleet Management Utilizing Programmed Hotspot Patterns," Proc. SPIE, Vol. 7028, 70280W (2008).

BRIEF SUMMARY OF THE INVENTION

Certain embodiments of the present invention comprise systems and methods for tuning photolithographic processes. Scanner tuning can be categorized into scanner matching, scanner tuning for process matching, and scanner tuning for performance optimization. Hereafter, the tunable scanner to be tuned is referred to as the target scanner, and the desired result of the tuning exercise is referred to as the reference. In certain embodiments, the tuning reference may be measured wafer contours or CDs, simulated wafer contours or CDs, or design target polygons.

In certain embodiments of the invention, a model of the target scanner is maintained, wherein the model defines sensitivity of the target scanner, and components of the target scanner, to a set of tunable parameters. A differential model can be generated to represent deviations of the target scanner from the reference. The target scanner may be tuned based on the settings of a reference scanner and the differential model.

Certain embodiments provide systems and methods for characterizing performance of a family of related scanners relative to the performance of a reference scanner. The family of scanners may include scanners manufactured by a single vendor and scanners in the family may belong to the same model type or different model types. The family of scanners may include scanners manufactured by different vendors where the scanners include at least some functionally similar elements. For example, scanners using a specific wavelength laser may be modeled with a common base model. Where a family of scanners is modeled by a common base model, additional differential models can be used to maintain calibration information and certain tuning information that accommodates variances of individual family members from the common base model. Differential models may include information such as parametric offsets and other differences that may be used to simulate the difference in imaging behavior.

Certain embodiments of the invention comprise model-based simulations up to the full-chip level to determine the deviation between achieved wafer contour and the reference. Such simulated deviations are combined with measured deviations to drive the optimization of the target scanner settings. In certain embodiments, this optimization comprises one or more iterations.

In certain embodiments, the changes in critical dimension (CD) or wafer contour as a result of scanner knob changes are simulated via a sensitivity model for the target seamier.

The invention itself, together with further objects and advantages, can be better understood by reference to the following detailed description and the accompanying schematic drawings.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

In certain embodiments of the invention, full-chip wafer simulation and verification is employed as an alternative or complement to full-chip wafer measurement for scanner tuning. Models used during simulation can include a sensitivity model and a differential model. The sensitivity model describes the changes in imaging behavior of a scanner in response to tuning inputs (i.e., when knobs are turned). The differential model describes and parameterizes the differences in behavior of the lithography processes under known settings. The calibration of differential models uses scanner sensor data such as Jones pupil, illuminator map, etc., as well as wafer metrology data.

Figure 1:
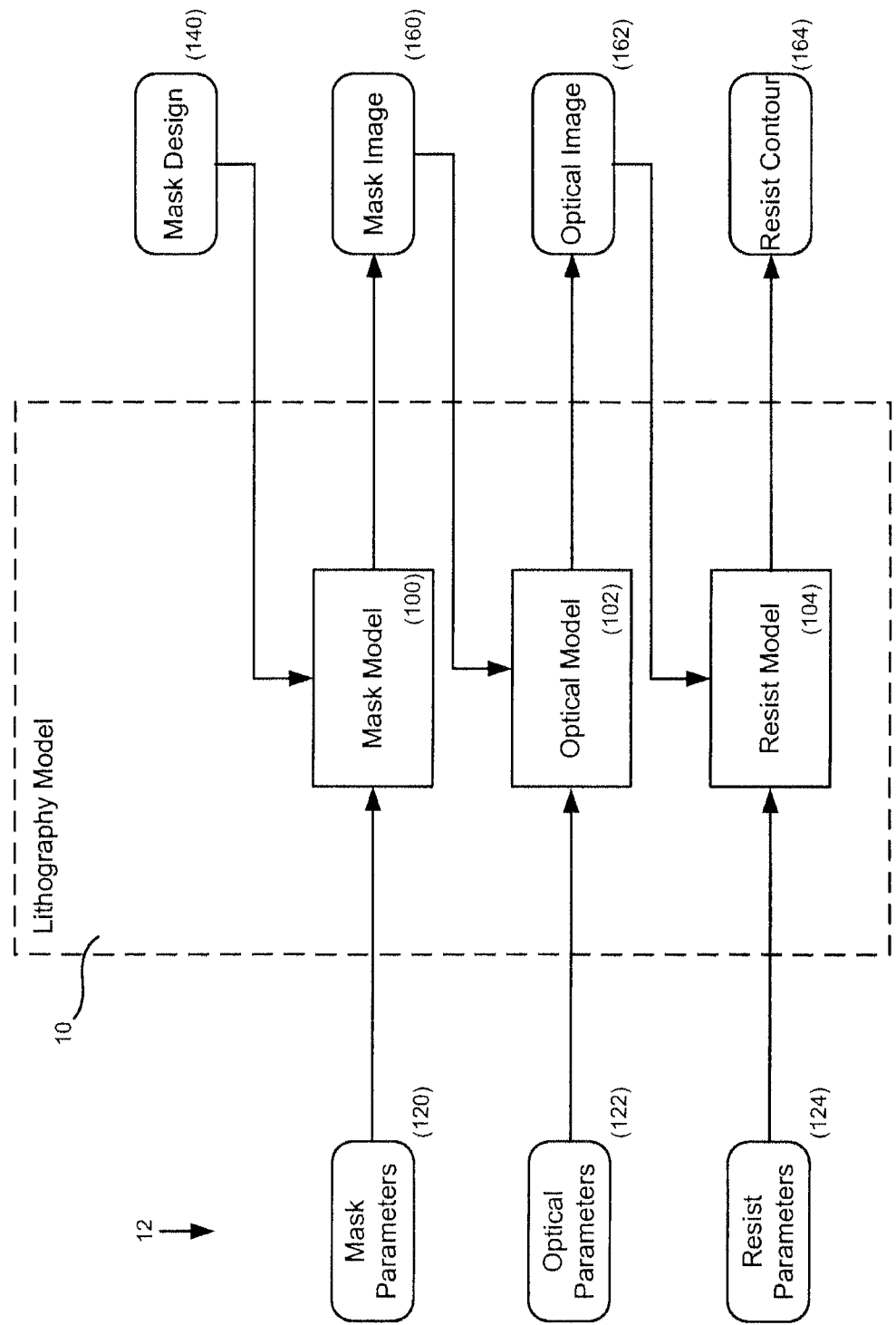
FIG. 1 illustrates a lithography model according to certain aspects of the invention.

FIG. 1 illustrates a lithography model 10 according to certain aspects of the invention. Lithography model comprises mask model 100, optical model 102 and resist model 104. In some embodiments, the lithography model also comprises an etch model, which is not shown in the drawing for sake of brevity. Mask model may reflect the variability introduced by changes in a plurality of mask parameters 120, optical model 102 may be affected by changes in optical parameters 122 and the resist model 104 may be controlled by the settings of resist parameters 124. Model 10 may be used to predict the resist contour 164, or if an etch model component is included, the after-etch contour that would be generated from mask design 140. Mask model 100, configured by mask parameters 120, produces a predicted mask image 160 which, when provided to optical model 102, produces simulated optical image 162 based on optical parameters 122. Resist model 104, configured by resist parameters 124, can be used to predict resist contour 164 from the simulated optical image 162. If included, an etch model, configured by the etching parameters, can be used to predict the after-etch contour from the resist contour 164.

Optical parameters 122 include tunable and non-tunable parameters, where "tunable parameter" refers to a knob that can be adjusted on the scanner, such as NA (numerical aperture), while "non-tunable parameter" refers to scanner parameters that cannot be adjusted, such as the Jones pupil for typical scanner designs. The methodology of the invention does not depend on which parameters are tunable or non-tunable on the scanners. For the purpose of model calibration, both non-tunable and tunable parameters may be adjusted until the image generated by the model matches the actual imaging result produced by the reference scanner. The adjustment of parameters in model calibration is subject to the degree of knowledge of these parameters, instead of tunability. For example, if accurate measurements of the illumination pupil are available via scanner metrology, such measurements can be used in the model calibration directly, without further adjustment. On the other hand, parameters without direct measurement via scanner metrology are to be optimized in order to fit wafer data. The scanner metrology measurements can be performed using an integrated lens interferometer. In an embodiment the integrated lens interferometer is a wavefront sensor, and is used to measure lens aberrations per field point. The wavefront sensor is based on the principle of shearing interferometry and comprises a source module and a sensor module. The source module has a patterned layer of chromium that is placed in the object plane of the projection system and has additional optics provided above the chromium layer. The combination provides a wavefront of radiation to the entire pupil of the projection system. The sensor module has a patterned layer of chromium that is placed in the image plane of the projection system and a camera that is placed some distance behind said layer of chromium. The patterned layer of chromium on the sensor module diffracts radiation into several diffraction orders that interfere with each other giving rise to a interferogram. The interferogram is measured by the camera. The aberrations in the projection lens can be determined by software based upon the measured interferogram.

Figure 2:
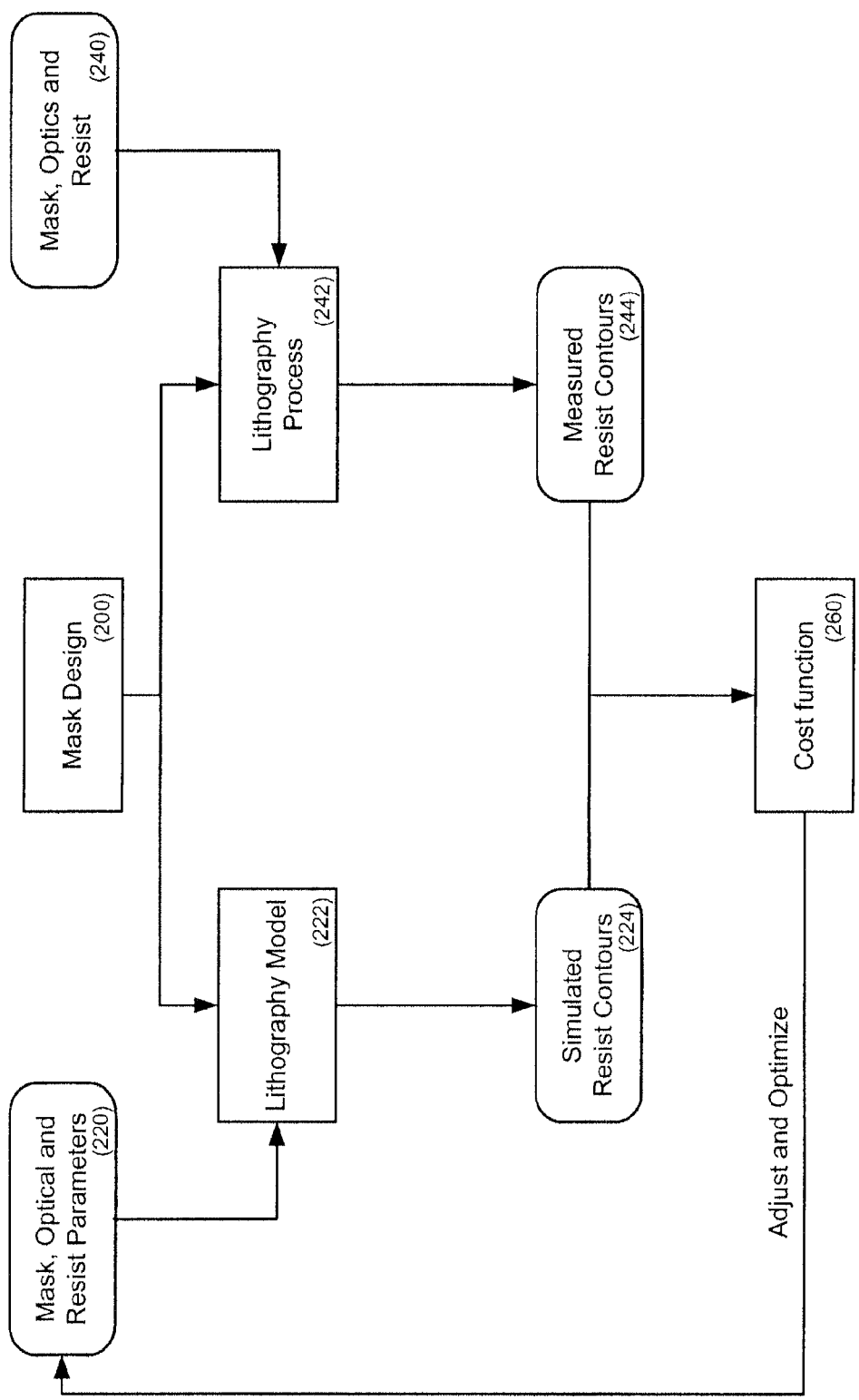
FIG. 2 illustrates a general procedure for calibrating a lithography model according to certain aspects of the invention.

FIG. 2 illustrates a general procedure for calibration of a lithography model 222. One or more mask designs 200 may be used for calibration. Mask design 200 may be created specifically for calibration in some embodiments, although other embodiments calibrate using mask designs that are created for production use. Modeled mask, optical and resist parameters 220 used in lithography model 222 are selected to reflect mask, optics and resist effects 240 used in a lithography process 242. Resultant simulated resist contour 224 and measured resist contours 244 can be compared and analyzed and parameters 220 may be optimized to minimize the difference between simulated and measured contours. Analysis may be performed using a cost function 260, which will be described in more detail below.

In certain embodiments, the model calibration process is formulated as a maximum likelihood problem, taking into account and balancing all measurements and their respective uncertainties, including both wafer metrology (CD-SEM measurements and contours, scatterometry, etc.) and scanner data (either designed or measured). In certain embodiments, the calibration process is iterative, whereby model parameters are repetitively adjusted to obtain a calibration that provides imaging results produced by the model that are determined to be sufficiently close to the actual wafer data. Predefined error criteria can be established and/or criteria for a "best match possible" can be defined or quantified. In certain embodiments, any suitable model for simulating the imaging performance of a scanner can be used, including for example, those provided by the systems and methods of U.S. Pat. No. 7,003,758.

Absolute Accuracy vs. Differential Accuracy

For traditional model-based OPC applications, emphasis has largely been on absolute prediction accuracy, typically against CD-SEM measurements, at nominal exposure conditions. With the advent of OPC verification over process window and process-window-aware OPC, the emphasis has expanded to cover prediction accuracy over process window (U.S. patent application Ser. No. 11/461,994, "System and Method For Creating a Focus-Exposure Model of a Lithography Process"). However, the figure of merit remains the difference between measured and predicted CDs.

Emphasis is necessarily different for model-based scanner tuning that includes matching and performance optimization. The quantities of interest include CD differences caused by scanner setting changes, scanner-to-scanner differences and/or process-to-process differences. The quantities are typically measurable on the order of a few nanometers or less, which is comparable to the absolute accuracy of typical OPC models. To model, simulate, and predict such differences imposes different requirements on the model accuracy compared to those needed for OPC modeling. Certain embodiments of the invention employ novel algorithms that address and satisfy these different requirements.

Figure 3:
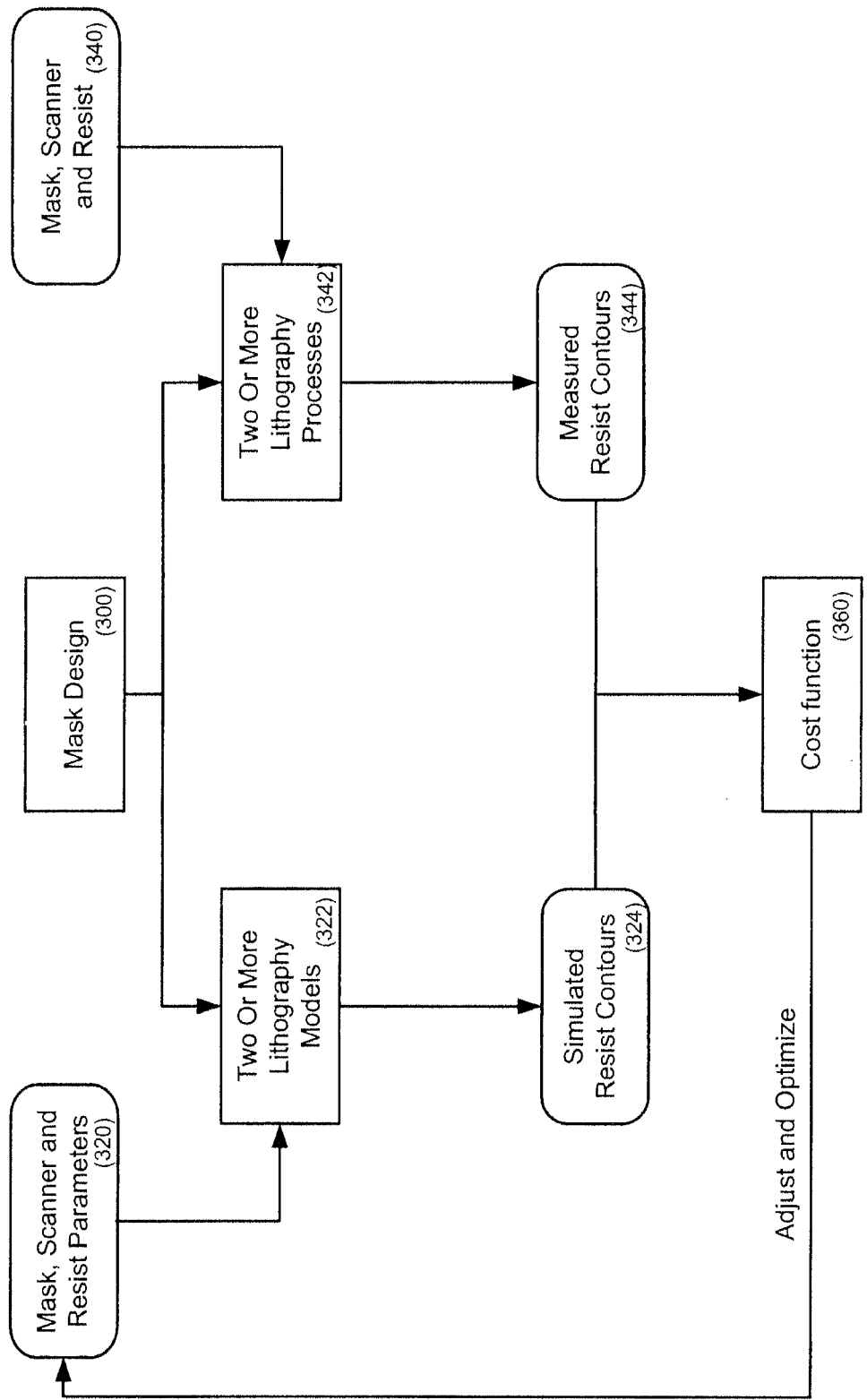
FIG. 3 illustrates a process for generating, adjusting and optimizing a differential lithography model according to certain aspects of the invention.

FIG. 3 illustrates a process for generating, adjusting and optimizing a differential lithography model 322. A mask design 300 is submitted for processing by a plurality of scanners 342 and for simulation using models of the scanners 322 under a set of process conditions 340. Simulated resist contours 324 can be analyzed with respect to physically generated resist contours 344. Cost function 360 (discussed below) can be used to adjust model parameters 320 in order to obtain a model that can accurately characterize the differential model or models associated with the plurality of scanners.

Differentially accurate models still formally simulate the pattern contour on wafer, either after resist development or after etch. However, the goal of such models is not necessarily absolute CD accuracy, but rather the accuracy in predicting CD changes or contour changes when one or more model parameters are perturbed, either to account for the differences between scanners, or to simulate the effects of active scanner tuning. As such, a simulation could require two passes, one without and one with the parameter perturbation. The quantity of interest for a given pattern i is:

$$\Delta CD_i = CD(\text{pattern\_}i, \text{perturbed\_model}) - CD(\text{pattern\_}i, \text{unperturbed\_model}).$$

Generation of Derived Models

Assuming that a model with sufficient differential accuracy (a "differential model") is available, certain aspects of the invention facilitate the generation of derived models based on the differential model and a base model. In certain embodiments, the base model is the same as the before-perturbation model, in which case the derived model would be the same as the after-perturbation model. In these embodiments, the derived model requires only one imaging simulation using the perturbed model. In other embodiments, the base model is different from the before-perturbation model, in which case the derived model requires three imaging simulations, each using the base model, the unperturbed model and the perturbed model. In one example of these latter embodiments, the base model can be an OPC model.

Sensitivity Modeling

Figure 4:
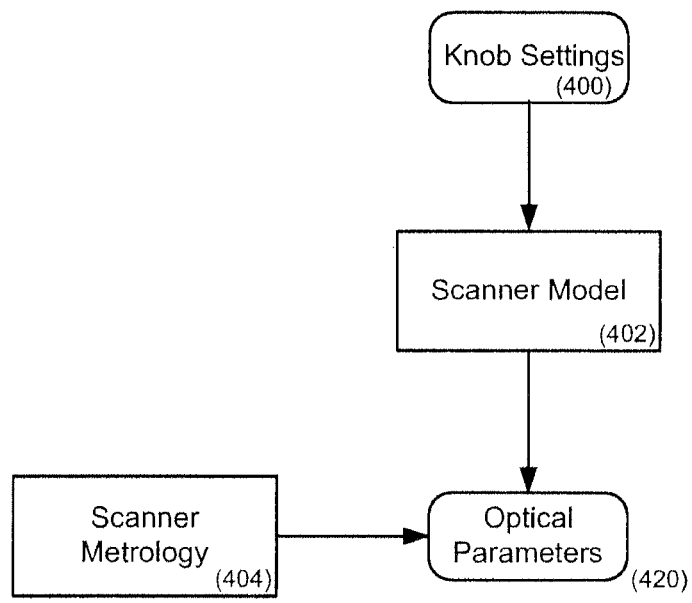
FIG. 4 illustrates an example of a process for simulating and predicting optical parameters from a scanner model complemented by scanner metrology, according to certain embodiments of the invention.

FIG. 4 illustrates the effect of knob settings 400 on optical parameters 420 via scanner model 402 and scanner metrology 404. Certain optical parameters are not affected by changes in the available or employed scanner knobs, and therefore can be fixed entirely by scanner metrology. Examples of this include the laser spectrum for scanners fitted with lasers that have no bandwidth control. In other cases, the optical parameters are affected by knob changes and can be derived from a combination of scanner model 402 and scanner metrology 404. For example, the illumination pupil is affected by NA and sigma changes and by other changes, including ellipticity settings, on certain types of scanners. As such, the illumination pupil can be predicted using pupil measurements combined with scanner models.

Figure 5:
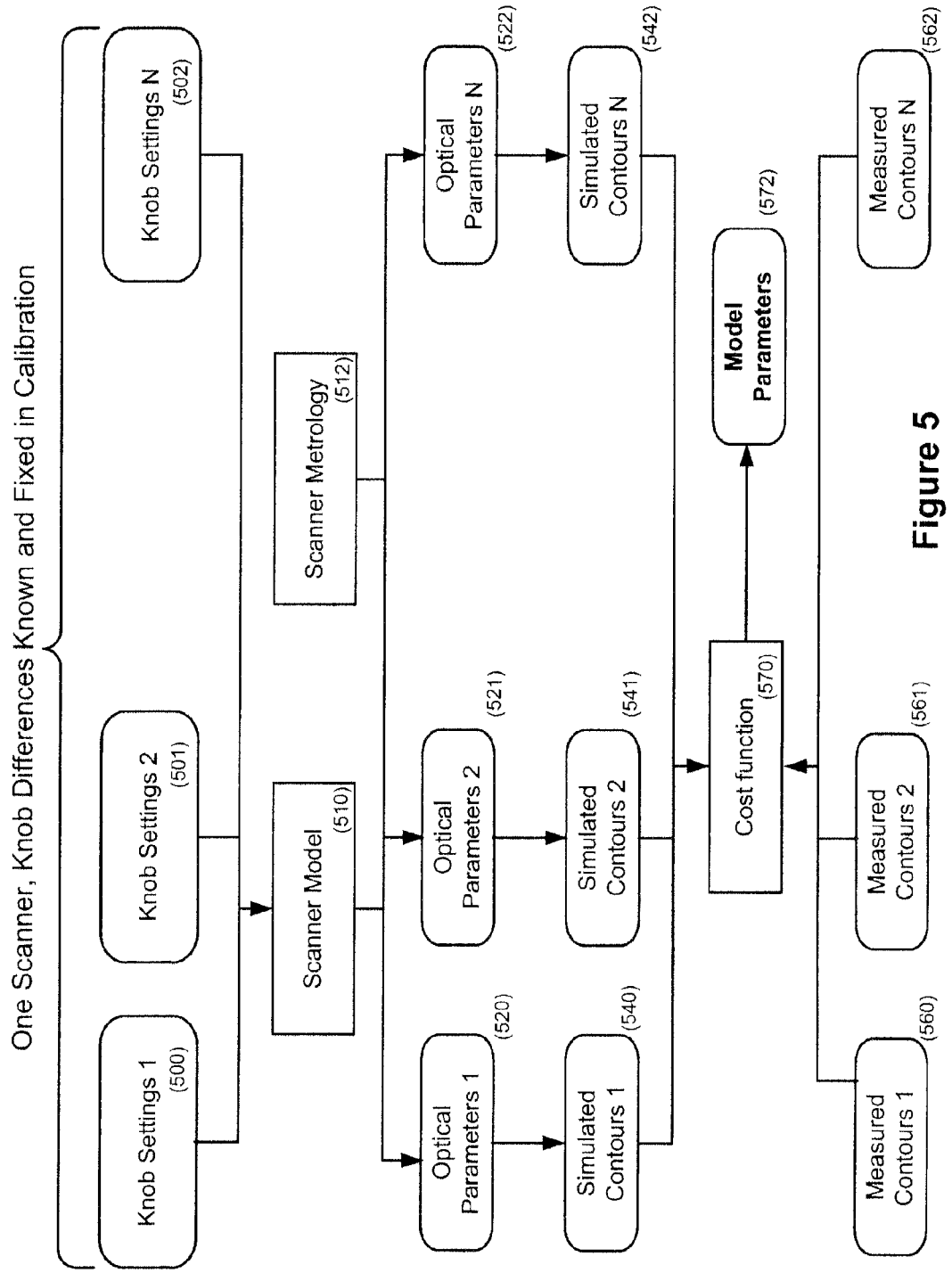
FIG. 5 illustrates sensitivity modeling according to certain aspects of the invention.

FIG. 5 illustrates a fundamental aspect of the present invention, which comprises predicting imaging changes for arbitrary patterns (viz. critical dimension changes and contour changes) in response to setting changes on one scanner while keeping all other aspects of the lithography process unchanged. In the example depicted, a series of N simulations are performed where each simulation produces a simulated contour 540-542 corresponding to a measured contour 560-562 (respectively) that is available or produced under the simulated conditions. Each simulation may be distinguished by a different set of knob settings 500-502 used by scanner model 510. The scanner model 510 produces optical parameters 520-522 that may optionally be generated using input from scanner metrology 512 and optical parameters 520-522 are used to generate respective simulated contours 540-542. Simulated contours 540-542 and measured contours 560-562 may be analyzed to generate, calibrate and optimize model parameters 572. In one example, simulated and measured contours may be processed mathematically using a cost function 570.

Symbolically, the goal of sensitivity modeling is to predict the CD change $\Delta CD_i$ for pattern i in response to knob changes $\Delta k_j$. For typical seamier tuning applications, a linear model can work reasonably well because the tuning amount is small, although the invention is by no means limited to the scenario of linear models. Thus, where the linear model is applicable, $$\Delta CD_i = \sum_j \frac{\partial CD_i}{\partial k_j} \Delta k_j,$$

the purpose of the sensitivity model is to calculate the partial derivatives $$\frac{\partial CD_i}{\partial k_j},$$

given the mask pattern i. By the chain rule of derivatives:

$$\frac{\partial CD_i}{\partial k_j} = \sum_m \frac{\partial CD_i}{\partial p_m} \frac{\partial p_m}{\partial k_j},$$

where $p_m$ refers to a physical parameter in the scanner model. It is therefore apparent that the first factor $$\frac{\partial CD_i}{\partial p_m}$$

concerns the lithography imaging model, while the second factor $$\frac{\partial p_m}{\partial k_j}$$

concerns the scanner model.

In the more general, non-linear case, the physics and models can be represented as:

$$CD_i(k_j) = f(k_j) = f^{litho}(p_m) = f^{litho}(f^{scanner}(k_j))$$

The resist, optical, and scanner physics can be represented as separate modeling components. The accuracy of the sensitivity model depends on the accuracy of both the litho model (optical and resist) and the scanner model 510.

The resist model may be empirical or may be based on the physics and chemistry of the resist process. The optical model is usually a physical model and based on first principles, with the possibility of approximate treatment of certain effects such as 3D scattering of EM radiation by the mask in order to reduce simulation time. Other approximations are also possible including, for example, a truncation of the optical interaction range (also known as finite ambit), or a truncation of the TCC eigen series in the Hopkins approach. The scanner model 510 can be based on physical considerations and design knowledge of the scanners. Different levels of rigor may also exist for the scanner models. For example, models based on ray tracing can create very accurate predictions of the pupils but tend to be very expensive computationally. Approximate and more empirical models may be constructed, either by calibrating against rigorous models or measurements.

The concept of sensitivity model accuracy is closely related to that of model separability, both having to do with imaging predictions for different scanner settings. See, e.g., U.S. patent application Ser. Nos. 11/461,929 and 11/530,402. For OPC-type applications, separable models are desirable for prediction accuracy over process window (typically focus and exposure), and for reduction in model calibration turnaround time when exposure settings are changed. The litho model typically comprises an optical model, a resist model and, sometimes, an etch model, and separability is emphasized between the different model steps.

One differentiating factor of the sensitivity model for the purpose of scanner tuning is the incorporation of a predictive scanner model, which requires detailed knowledge of the scanner design. An exemplary component of the scanner model 510 is the illuminator predictor model, which simulate the illumination optics and predicts the illumination at the reticle plane. In the context of sensitivity modeling, this model predicts the changes in the illuminator under changes in the exposure settings such as NA, sigma and PUPICOM settings.

The separability of the model form also permits an accurately calibrated resist model to be ported between a plurality of scanners when the resist process is the same or sufficiently close for the plurality of scanners and where the calibrated resist model is part of an accurately calibrated sensitivity model from a lithography process using one scanner. This flexibility can be important in practice, as resist models tend to be more empirical than optical and scanner models and, hence, require more constraining from wafer-based calibrations. Porting the resist model therefore allows for efficient use of wafer metrology. The scanner model 510 and optical model are based more on first principles and known physics, and are less dependent on wafer measurements.

In other embodiments, lithography processes are substantially different in the resist portion. For example, one process employs immersion lithography and another process does not; the two processes typically use totally different resist materials and film stacks. In the example, the resist model is not portable between the two processes and sensitivity models need to be built separately because the resist effects are substantially different.

For calibration of the sensitivity model, some embodiments include detailed scanner data such as Jones pupil, stage vibration, focus blurring due to chromatic aberration and laser spectrum, etc. In certain embodiments, calibrating the sensitivity model requires taking wafer metrology data at a plurality of scanner settings, or perturbed conditions $(k_j + \Delta k_j)$ plus the nominal condition $k_j$. One or more knobs may be changed for each perturbed condition. The cost function for sensitivity model calibration is:

$$\sum_n \sum_{i=1}^{max\_i(n)} w^{absolute}(n,i)|CD^{Model}(n,i) - CD^{Wafer}(n,i)|^2 +$$

$$\sum_{n \in perturbed} \sum_{i=1}^{max\_i(n)} w^{sensitivity} \left| \begin{array}{c} (CD^{Model}(n,i) - CD^{Model}(nominal,i)) - \\ (CD^{Wafer}(n,i) - CD^{Wafer}(nominal,i)) \end{array} \right|^2$$

where the first term quantifies absolute accuracy via the weighted RMS difference of model and wafer, and the second term quantifies sensitivity accuracy comparing model predicted CD changes to wafer measured ones. The relative weighting of absolute and sensitivity accuracy can be adjusted. It is also possible to use other metrics instead of RMS, such as range (max–min) or LP-norms. The calibration can then be cast into an optimization problem, often subject to constraints.

The calibrated sensitivity model may be applied to the full-chip level to predict imaging differences for all patterns occurring in the chip design.

It is noted that the sensitivity model may be the same as, or different from, the lithography model used in OPC or even in OPC verification. In certain embodiments, the sensitivity model employs more knowledge of the lithography process than the OPC model related to the mask, the scanner optics, and the resist. For example, in certain embodiments the OPC model uses nominal or ideal optics only, with thin mask or Kirchhoff boundary condition for the mask diffraction, a small optical interaction range and/or a small number of terms from the TCC eigen series expansion. These modeling approaches may be insufficient for the accuracy requirements of sensitivity modeling. Accordingly, in certain embodiments, the sensitivity model employs more accurate information on the scanner optics, 3D mask diffraction, a larger optical interaction range and/or a larger number of TCC terms. The test patterns used for the calibration of the sensitivity model may be the same as or different from those used for OPC or OPC verification models.

In certain embodiments, the sensitivity model may be combined with a different base model, for example an OPC model, to form a new derived model. This new derived model can be formed by applying the delta CD or contour edge position from the differential model to the simulated CD or contour edge position from the base model, although it may be formed by applying the delta to model parameters, simulated aerial image, or simulated resist image. Applying delta to the model parameters is feasible only if the base model contains the parameters to be perturbed and makes use of such parameters in an accurate way. In certain embodiments, the base model is a calibrated model with a different form, or different vendor of modeling software, or different formulation of the model components, which would cause difficulties for directly applying the parameter deltas. Specifically, the base model may have used top-hat illumination shape, in which case applying the delta sigma values to the top-hat illumination would not give accurate results. The resist model in the base OPC model is also likely to be insufficient in terms of differential accuracy. Under such circumstances, it is feasible to combine the base OPC model and the sensitivity model at the simulated CD or contour level.

At least two benefits accrue from combining the sensitivity model with a base OPC model. First, the OPC model is typically calibrated with a large set of patterns, and serves to ensure absolute CD prediction accuracy to a certain requirement. Therefore, combining the sensitivity model with the OPC model can give an accurate prediction of absolute CD in the presence of scanner knob or parameter changes. Second, the OPC corrections are done with the OPC model, which means the simulated contours from the OPC model are expected to be very close to the pre-OPC target patterns. Combining the sensitivity model with the OPC model therefore enables simulation-based verification against the pre-OPC target, in the presence of scanner knob or parameter variations.

Differential Modeling

In some embodiments, system level simulation comprises defining the performance of a family of related scanners relative to the performance of a reference scanner. The family of scanners may include scanners manufactured by a single vendor and may belong to the same model type. The family of scanners may include scanners manufactured by different vendors where the scanners include at least some functionally similar elements. A family of scanners is modeled by a common base model, plus additional differential models to maintain calibration information that accommodates variances of individual family members from the common base model.

Figure 6:
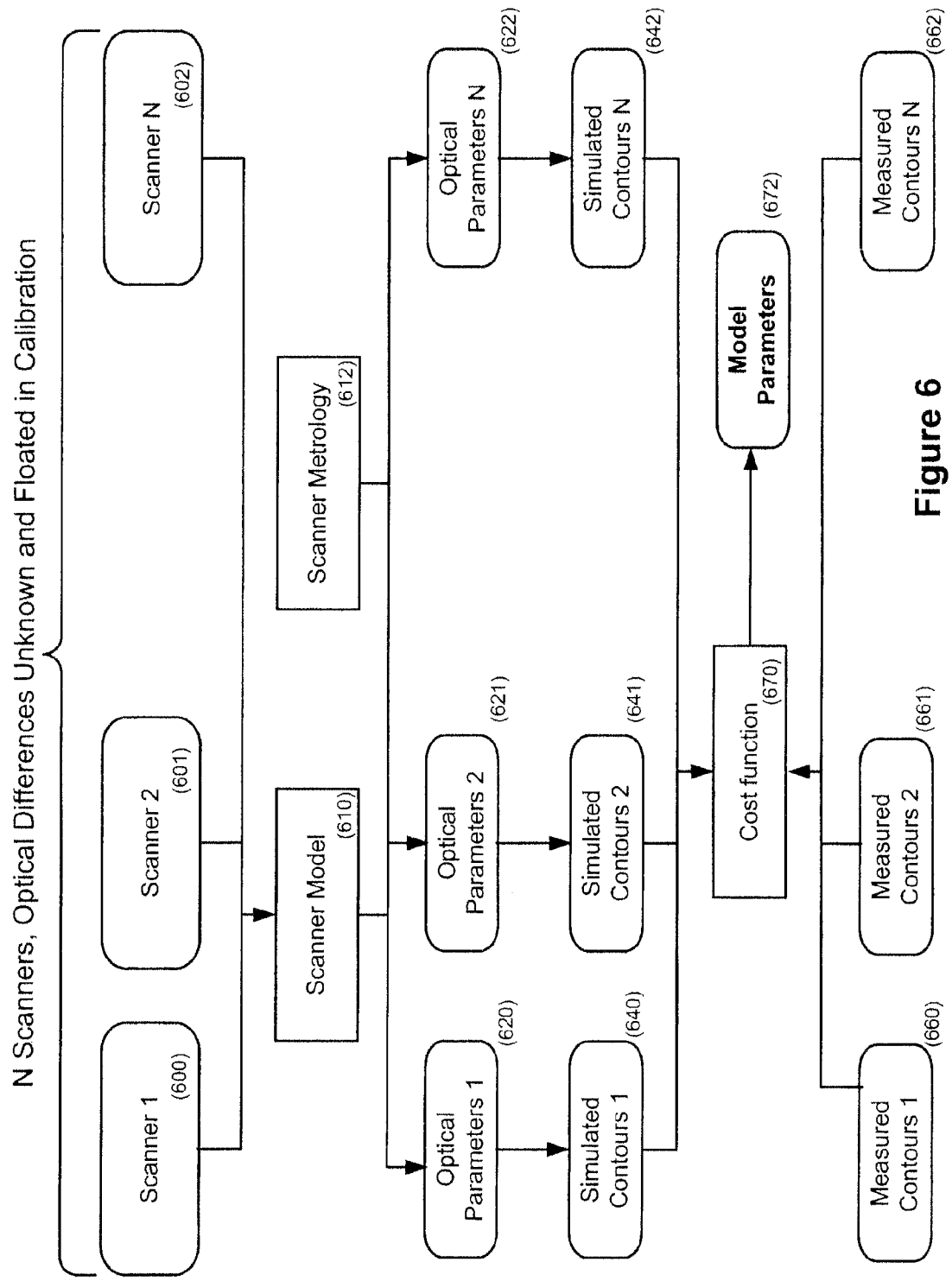
FIG. 6 illustrates a process for calibration of differential models for a plurality of scanners according to certain aspects of the invention.

FIG. 6 illustrates a process for calibration of differential models for a plurality of scanners according to certain aspects of the invention. In the example depicted, a set of N scanners 600-602 is simulated. Scanner model 610 produces optical parameters 620-622 for each of the scanners 600-602 using input from scanner metrology 612. Optical parameters 620-622 are used to generate respective simulated contours 640-642 which may then be processed with measured contours 660-662 to calibrate and optimize model parameters 672. Simulated and measured contours may be processed mathematically using a cost function 670.

For the purpose of differential model calibration, both the non-tunable and tunable scanner parameters may be adjusted until the simulated differences generated by the model match the actual wafer differences. The adjustment of parameters in differential model calibration is subject to the degree of knowledge of these parameters, instead of tunability. For example, if accurate measurements of the illumination pupil are available via scanner metrology 612 for the plurality of scanners 600-602, such measurements can be used in the model calibration directly, without further adjustment. On the other hand, parameters without direct measurement via scanner metrology 612 are to be optimized in order to fit wafer data. In certain embodiments, the model calibration process is formulated as a maximum likelihood problem, taking into account and balancing all measurements and their respective uncertainties, including both wafer metrology (CD-SEM measurements and contours, scatterometry, etc.) and scanner data (either designed or measured).

In some embodiments, differential modeling applies to a plurality of different lithographical processes and includes differences in lithographical steps besides scanners including, for example, mask differences (spatial bias distribution, proximity effects due to mask making, corner rounding), resist material differences (quencher concentration, diffusion), track differences (baking temperature) and etch differences.

One important issue related to differential model calibration is the possible degeneracy between different process parameters, in terms of their impact on imaging for the set of calibration patterns chosen. This means that the imaging differences on the calibration patterns may be wrongly attributed to parameter differences that are far off from the true differences as a result of the calibration, because certain parameters may have correlated or degenerate effects on imaging of a sub-optimally chosen set of calibration patterns. For example, an exposure dose difference may be degenerate with mask bias, both causing the feature CDs to change in one direction (larger or smaller). This problem is exacerbated by the presence of random noise in the wafer measurements. For this reason, some embodiments select patterns that are sensitive to the parameter differences, in an "orthogonal" way. Otherwise, the wrongly calibrated parameter differences may result in wrong predictions of imaging differences, especially for patterns not covered by the calibration set.

Simulations can be used to predict differences in physical results obtained from a physical target scanner $CD_{DEV}^{Wafer}$ and a physical reference scanner $CD_{REF}^{Wafer}$, expressed as:

$$(CD_{DEV}^{Wafer} - CD_{REF}^{Wafer}).$$

A differential model identifying differences in results of modeled target scanner $CD_{DEV}^{Model}$ and modeled reference scanner $CD_{REF}^{Model}$ can be expressed as:

$$(CD_{DEV}^{Model} - CD_{REF}^{Model}).$$

Accuracy of the differential model may therefore be expressed as:

$$(CD_{DEV}^{Wafer} - CD_{DEF}^{Wafer}) - (CD_{DEV}^{Model} - CD_{REF}^{Model}).$$

The RMS or other metric (range, LP-norm, etc.) calculated for a set of test patterns based on the above quantity is used as the cost function for the calibration of the differential model.

Certain embodiments employ a calibration procedure to be used when wafer data are available for both current process condition and tuning target process condition. For example, when two physical scanners are to be modeled under the same resist process, joint calibration may be performed on the wafer data utilizing both current scanner and target scanner conditions. This typically entails performing a joint model calibration process which allows resist model parameters to vary but forces them to be the same in both the current scanner condition and the target scanner condition, and which allows the scanner parameters to independently vary under both conditions. After the joint calibration, the sensitivity model and the differential model are obtained simultaneously.

Figure 7:
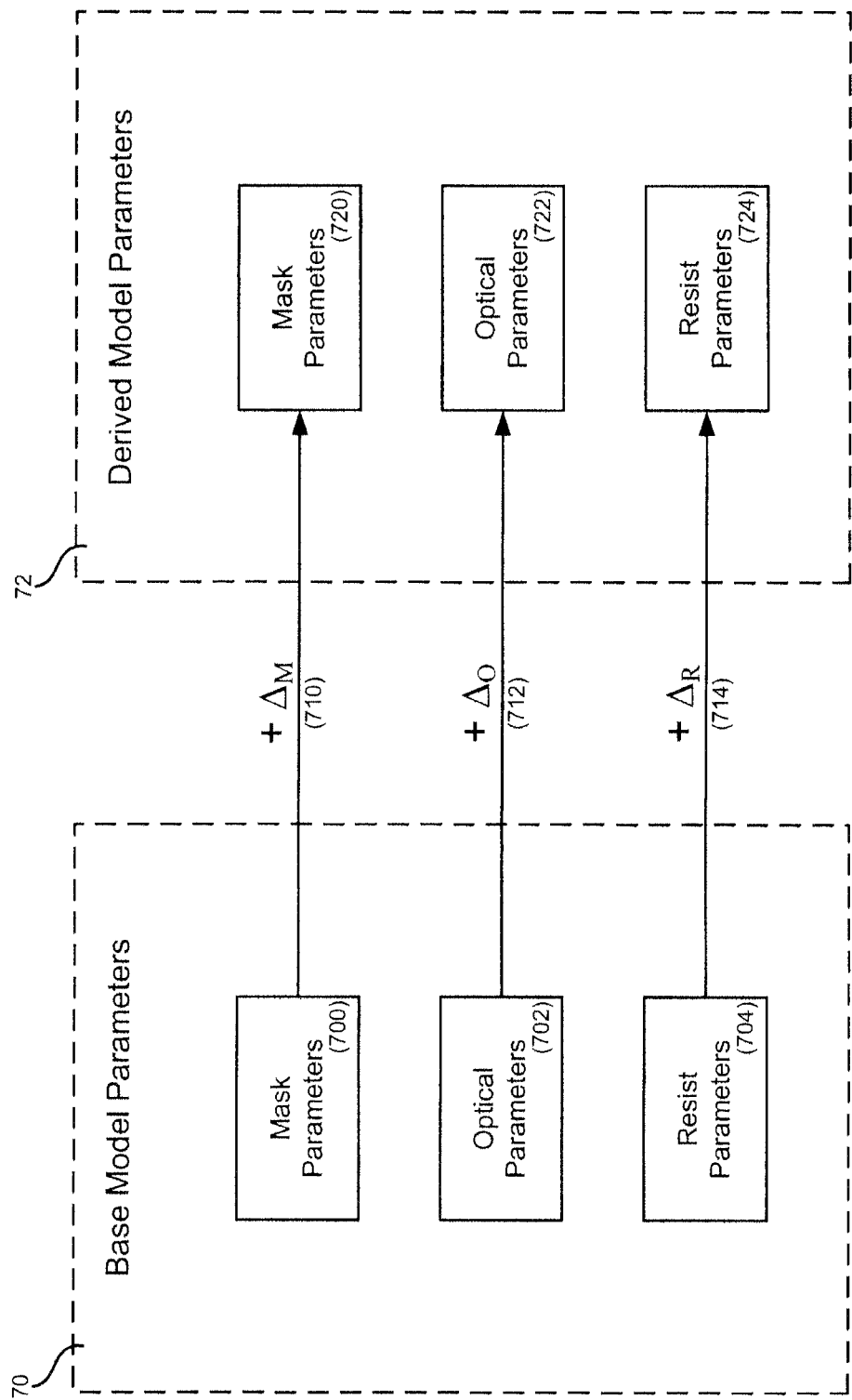
FIG. 7 graphically illustrates the relationship between base model parameters and derived model parameters in certain embodiments of the invention.

To make use of the result of the differential calibration, a new model is formed from the base model and the calibrated parameter differences. The simulated CD difference between this derived model and the base model is taken as a prediction of actual difference from wafer measurements. FIG. 7 graphically illustrates the relationship between base model parameters 70 and derived model parameters 72: mask parameters 720 in derived model 72 can be calculated using mask parameters 700 of base model 70 and differences 710; optical parameters 722 in derived model 72 can be calculated using optical parameters 702 of base model 70 and differences 712; and, resist parameters 724 in derived model 72 can be calculated using resist parameters 704 of base model 70 and differences 714.

In certain embodiments, the differential model may be combined with a different base model, for example an OPC model, to form a new derived model. This new derived model may optimally be formed by applying the delta CD or contour edge position from the differential model to the simulated CD or contour edge position from the base model, although it may be formed by applying the delta to model parameters, simulated aerial image, or simulated resist image. Applying delta to the model parameters is feasible only if the base model contains the parameters to be perturbed, and makes use of such parameters in an accurate way. In certain embodiments, the base model is a calibrated model with a different form, or different vendor of modeling software, or different formulation of the model components, which would cause difficulties for directly applying the parameter deltas. Specifically, the base model may have used top-hat illumination shape, in which case applying the delta sigma values to the top-hat illumination would not give accurate results. The resist model in the base OPC model is also likely to be insufficient in terms of differential accuracy. Under such circumstances, it is feasible to combine the base OPC model and the differential model at the simulated CD or contour level.

Figure 8:
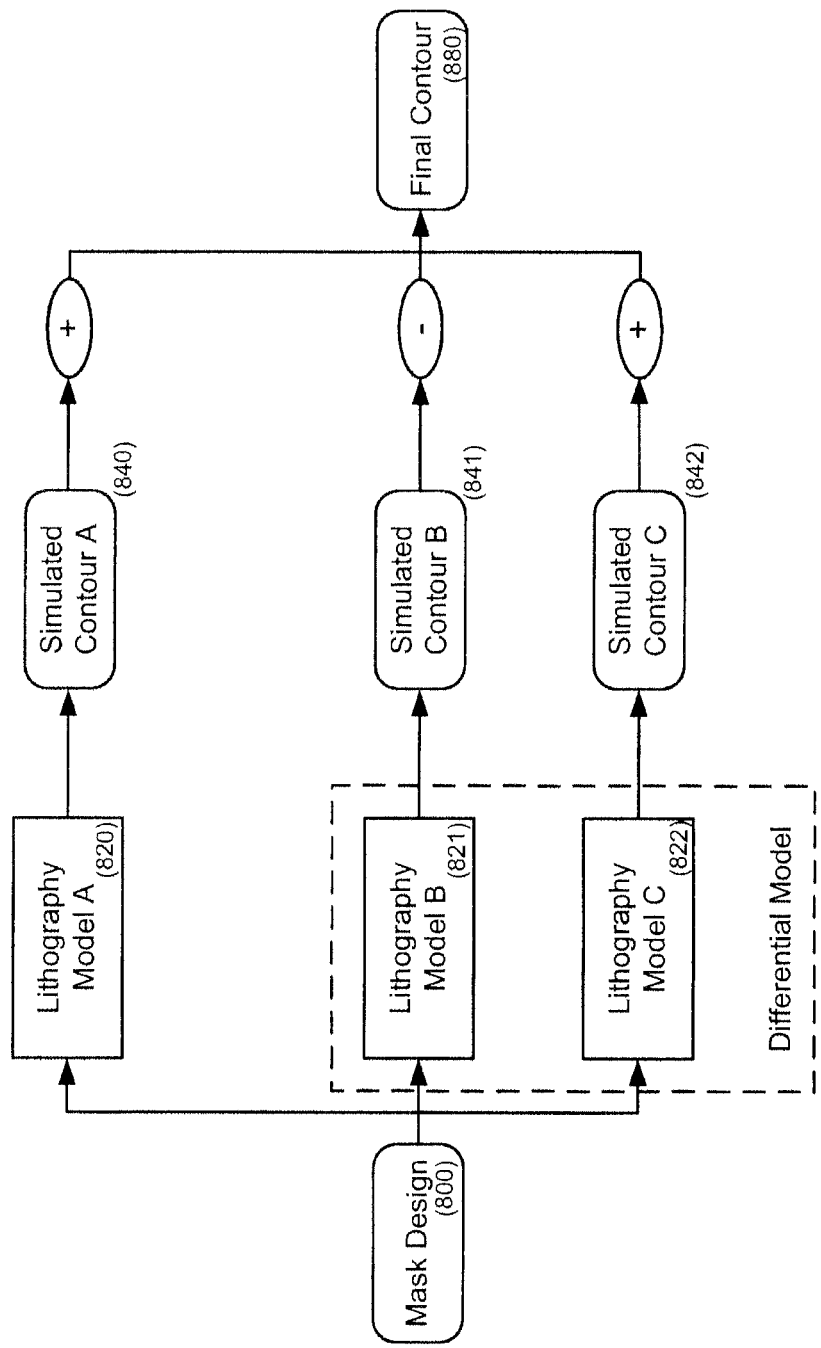
FIG. 8 illustrates a generation of simulated contours from a differential model, according to certain aspects of the invention.

As illustrated in FIG. 8, the mask design 800 is used as input for lithography simulations. Simulated contour A 840 is generated from the lithography model A 820 (base model). From the differential model, simulated contours 841 and 842 are generated from models 821 and 822. The delta between contours 821 and 822 is added to contour 840, to form the final simulated contour 880. In some embodiments, the arithmetic operations (+ and −) are applied in the sense of edge movements along the normal direction of the contour.

At least two benefits accrue from combining the differential model with a base OPC model. First, the OPC model is typically calibrated with a large set of patterns and serves to ensure absolute CD prediction accuracy to a certain requirement. Therefore, combining the differential model with the OPC model can give an accurate prediction of absolute CD in the presence of lithography process differences, including scanner differences. Second, the OPC corrections are made with the OPC model, which means the simulated contours from the OPC model are expected to be very close to the pre-OPC target patterns. Combining the differential model with the OPC model therefore enables simulation-based verification against the pre-OPC target, in the presence of lithography process differences.

Scanner Tuning and Simulation Using Tuned Models

For scanner matching and performance optimization, tuned models are generated based on the sensitivity model and the base model, plus the knob offsets. This comprises using the resist model part of the sensitivity model, changing the parameters representing the scanner knobs to include the knob offsets, and combining with the base model.

In certain embodiments of the invention, full-chip wafer simulation and verification is employed as an alternative to full-chip wafer measurement for scanner tuning. The difference between desired contour target and actual contour (measured or simulated) can be used to drive the calculation of the necessary knob offsets, such that the printed contour matches the target within acceptable tolerances. Details related to methods for tuning offset generation, simulation, and verification are described below.

Aspects of the present invention can allow scanners to be tuned to a known model or a known wafer contour or other target pattern. Processes provided in accordance with aspects of the invention allow for lithography process drift corrections, scanner optimization for a given OPC process, scanner optimization for a specific device mask in order to optimize CDU and scanner optimization for a known mask error.

Where desired, the effect of tuning on the pattern can be analyzed using an OPC verification tool, since the model can quantitatively analyze the impact of tuning-related changes to the model on full chip patterns. In one example according to certain aspects of the invention, a suitable method may include the steps of using the OPC verification tool to simulate full chip on-wafer contour using models before and after tuning, and comparing the difference between the two contours to analyze differences between the two models.

Lithographic Apparatus and Process Tuning

Inventive methods for tuning offset generation, simulation, and verification according to further aspects of the invention are described below.

In an embodiment, a tuning reference comprises measured wafer contours. In alternative embodiments the tuning reference comprises CDs, simulated wafer contours or CDs, design target polygons or a combination of any of the herefore mentioned types of tuning references. In an embodiment different types of reference (for instance wafer measurements, wafer simulations and design polygons) apply to a subset of all the patterns on the chip. Measured and/or simulated wafer contours may be used as tuning references in order to match the performances of two or more scanners and to reduce variability in the manufacturing process. Design target polygons may be used as tuning references in order to improve pattern fidelity on wafer including, for example, CD uniformity. It will be appreciated that the ultimate purpose of scanner tuning is to improve the yield when producing integrated circuit chips or to improve the electrical performance of working integrated circuit chips produced by lithographic apparatus tuned according to the invention.

Scanner tuning can be categorized into scanner matching, scanner tuning for process matching, and scanner tuning for performance optimization, based on the types of process differences or deficiencies to be compensated. In the simplest case, scanner matching is employed to compensate for scanner-to-scanner differences and match imaging performances of a plurality of scanners in the absence of mask, resist or etch differences. Additionally, process differences can exist in mask, resist or etch (in addition to potential scanner differences), and the scanners may be tuned to compensate for all differences to obtain process matching. In another example, scanner tuning can compensate for catastrophic or yield-limiting defects resulting from imperfections in OPC correction and/or mask making processes. Tuning may also be employed to improve CD uniformity of the device layer.

In certain embodiments, the scanners involved in the tuning may be provided by the same manufacturer and can be the same type (e.g., both may be ASML XT:1900i scanners), of the same manufacturer but different types (e.g., one ASML XT:1900i scanner and one ASML XT:1700i scanner) or the scanners may be manufactured by different manufacturers.

Model Generation and Simulation

Certain embodiments of the invention assess and optimize the imaging impact on a large set of patterns, including full-chip, as a result of scanner tuning. The current technology for wafer metrology does not offer an economical way of achieving this goal. In an embodiment a sensitivity model is used to derive a set of desired parameter values (knob offsets) and the desired parameter values (knob offsets) are be used to obtain simulated wafer contours. In a further embodiment a differential model is used to predict contour and/or CD differences between reference and target scanners. Details on the model generation and simulation are provided above. Suitable models for simulating the imaging performance include, for example, systems and methods described in U.S. Pat. No. 7,003,758.

Tuning Flow

Certain embodiments of the present invention comprise systems and methods for tuning photolithographic processes. According to certain aspects of the invention, tunable and non-tunable characteristics of scanners can be modeled and used to drive the tuning. A target scanner can be tuned towards the reference using a sensitivity model of the target scanner, where the sensitivity model defines the imaging sensitivity of the target scanner relative to a set of tunable parameters. A target scanner differential model can be generated to represent deviations of the target scanner from the reference in terms of imaging performance. The differential model may include non-tunable differences in performance characteristics between scanners, which in some instances may be accommodated through adjustments of other, tunable parameters.

Figure 11:
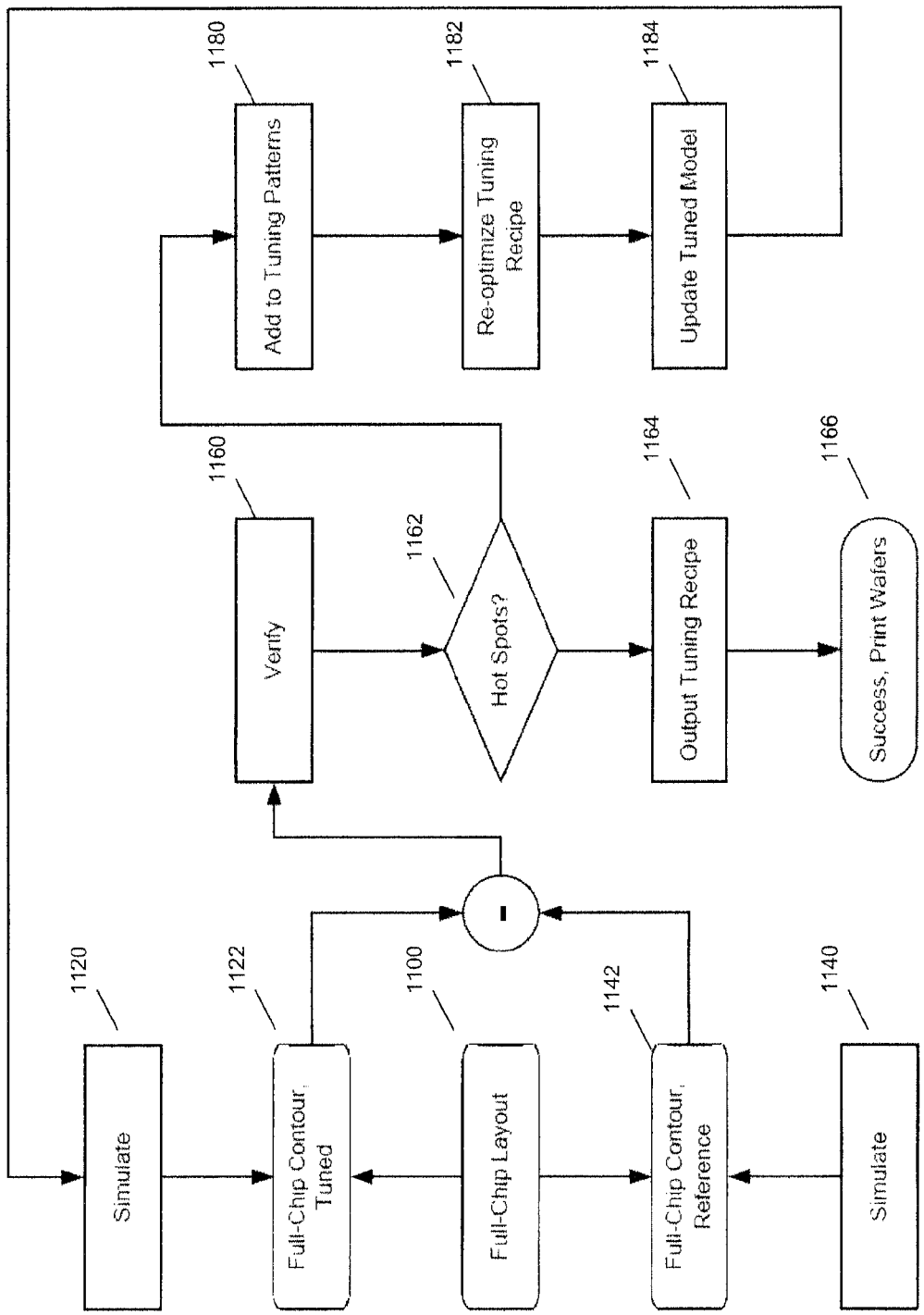
FIG. 11 is a flowchart illustrating a tuning method employing full-chip simulations according to certain aspects of the present invention.

In certain embodiments, the tuning method comprises one or more iterations and requires full-chip simulation and verification in each iteration using full chip simulation data. In an embodiment (FIG. 11), a trial tuning recipe (i.e. a trial set of parameter values) is initially generated based on a limited set of tuning target patterns (for example, 1D through-pitch patterns). The trial tuning recipe is generated using a linear or non-linear optimization procedure which solves for the combination of knob offsets (parameter values) and minimizes a cost function quantifying the deviation from a desired reference. With the trial recipe, a new lithography model can be generated according to the procedure described above in connection with FIGS. 1-8, which feeds into a full-chip simulation step 1120, using full-chip layout 1100 on which the tuning recipe will be applied. A verification step 1160 detects hotspots according to certain user-defined rules and tolerances, comparing the simulated contour 1122 generated by simulation 1120 to the reference contour 1142 separately generated by simulation step 1140, which applies the model for the reference on the same full-chip layout 1100. If one or more hotspots are identified at step 1162, then the hotspots may be added at step 1180 to the set of tuning target patterns to drive a new round of optimization 1182, from which an updated tuned lithography model 1184 is generated. The updated model 1184 will be fed back to simulation step 1120, and thus begins a new iteration. At convergence, an optimal tuning recipe 1164 is obtained which compromises and balances imaging performance for all the patterns present on the full-chip layout, and which can be used to print wafers 1166.

Figure 12:
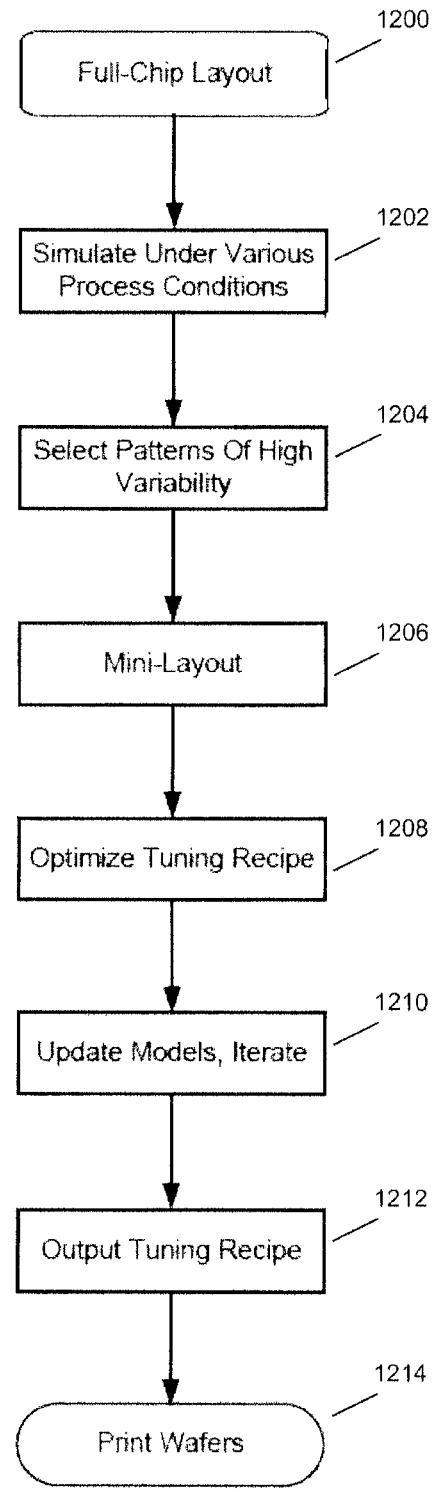
FIG. 12 is a flowchart illustrating a tuning process employing a mini-layout approach according to certain aspects of the invention.

In certain embodiments, the tuning process comprises one or more iterations in which the simulation and verification (steps 1208, 1210, 1212) in each iteration as described above and which results in a tuning recipe for printing wafers 1214 is carried out on a reduced set of patterns, hereafter referred to as "the mini-layout." With reference to FIG. 12, mini-layout 1206 includes a set of "warmspots" selected from the actual full-chip layout 1200 via a simulation and verification step 1202, which can identify critical areas and weak areas in the layout that may be selected at step 1204 for inclusion in mini-layout 1206. The selection of warmspots 1204 is typically based on considerations of pattern criticality and sensitivity to optical variations. The selection criteria can include contour CD exceeding a lower limit at nominal or perturbed conditions (indicating risk of bridging or necking), the difference between contour CD and target CD exceeding an upper limit at nominal or perturbed conditions, the difference in contour CD between nominal and perturbed conditions exceeding an upper limit (indicating the pattern is too sensitive to optical variations), the difference in contour CD between nominal mask pattern and biased mask pattern exceeding an upper limit (indicating high sensitivity to mask errors), and the aerial image or resist image slope exceeding a lower limit (indicating high sensitivity to exposure dose and other process effects).

The cost function to be optimized by tuning reflects the goal and reference of the tuning. In an embodiment the cost function comprises a plurality of terms corresponding to a plurality of patterns, with each term quantifying the deviation of the achieved contour from the reference contour on one or more patterns. In some embodiments, the terms are summed with pre-defined weights to calculate the overall cost function. In certain embodiments, the cost function terms take the form of sum of squared errors or other suitably defined norm of the errors between the achieved contour and the reference contour. In some embodiments, the cost function terms are of different forms for different pattern types, and include metrics such as min-max ranges for certain pattern types such as 1D through-pitch patterns. In certain embodiments, the cost function terms are asymmetric for positive and negative errors around the reference CD. For example, if the pattern exhibits potential risk of bridging or necking, it would be less detrimental for the tuned CD to err on the larger side than on the smaller side; therefore the cost function should penalize smaller CDs more heavily than larger CDs. In certain embodiments, constraints are applied to the deviations for certain patterns, representing the user's emphasis on the imaging performance of such patterns.

The cost function for scanner tuning is:

$$\sum_i \alpha_i norm(CD_i^{TUNED}(\Delta k_j) - CD_i^{REF}),$$

where $\Delta k_j$ denotes the knob offsets on the target scanner, with subscript j indexing the tunable knobs, and $CD_i^{TUNED}(\Delta k_j) - CD_i^{REF}$ denotes the deviation of certain imaging metrics between the achieved contour and the reference contour, with subscript i indexing the different patterns among the tuning target set and $\alpha_i$ indicating the weight of the cost term related to that metric for the related pattern. The term "CD" is used here to symbolically represent one or more imaging metrics, such as critical dimension, edge placement, overlay difference, and process window comprising focus and exposure latitude, and the choice of imaging metrics may vary from pattern to pattern. The norm may comprise one or more of sum-of-square i.e. Euclidean, LP-norm, min-max range, etc. The norm may be asymmetric with regard to positive and negative differences in the imaging metric. The reference may be selected as measured wafer contours, simulated wafer contours, or design target polygons. The goal of scanner tuning is to minimize this cost function by choice of knob offsets.

Various linear and non-linear optimization techniques and algorithms can be used for the calculation of knob offsets, including least squares methods, quadratic programming, gradient-based methods such as Gauss-Newton, Levenberg-Marquardt, and BFGS algorithms and simplex method. Typically, the scanner knobs are subject to machine constraints, which can be incorporated into the optimization procedure.

To illustrate the concepts, the linear case is used as an example below. In this case, the above cost function may be written as $$norm\left(CD_i^{UNTUNED} + \sum_j \Delta k_j \frac{\partial CD_i}{\partial k_j} - CD_i^{REF}\right)$$

where the partial derivatives of CD to knob are generated from the sensitivity model. In some embodiments, the nom) is Euclidean, and the knob offsets can be solved by least squares methods. Further, for scanner matching or process matching when the reference is the contour from a reference scanner or reference process, the above cost function may be written as $$norm\left(CD_i^{UNTUNED} + \sum_j \Delta k_j \frac{\partial CD_i}{\partial k_j} - CD_i^{REF}\right) =$$

$$\text{norm}\left(\Delta CD_i^{DIFFERENTIAL} + \sum_j \Delta k_j \frac{\partial CD_i}{\partial k_j}\right)$$

where $\Delta CD_i^{DIFFERENTIAL}$ is the CD difference between untuned scanner and reference, as predicted by the differential model.

Model-based scanner tuning offers numerous advantages over conventional methods. Certain aspects of the present invention provides a systematic and cost-effective method for the optimization of imaging performance and OPE matching between different lithography systems, including scanners that are used to image a common target pattern.

Where desired, the effect of tuning on the pattern can be analyzed using an OPC verification tool such as Brion's Tachyon Lithographic Manufacturability Check ("LMC"), since the model can quantitatively analyze the impact of tuning-related changes to the model on full chip patterns. In one example according to certain aspects of the invention, a suitable method may include the steps of using LMC to simulate full chip on-wafer contour using models before and after tuning, and comparing the difference between the two contours to analyze differences between the two models.

Figure 9:
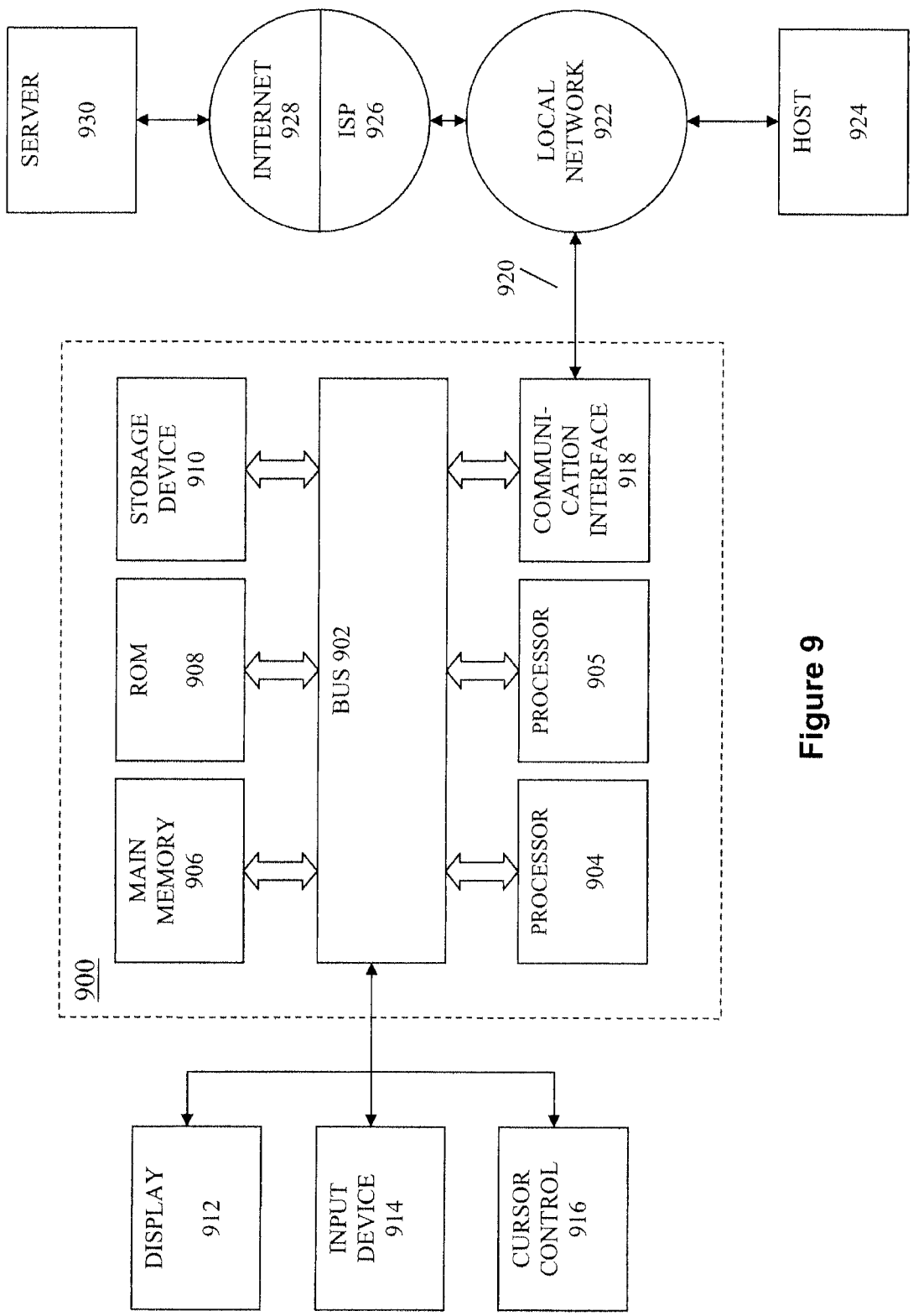
FIG. 9 is a block diagram that illustrates a computer system according to certain aspects of the present invention.

Turning now to FIG. 9, a computer system 900 can be deployed to assist in model-based process simulation methods of certain embodiments of the invention. Computer system 900 may include a bus 902 or other communication mechanism for communicating information, and a processor 904 (including perhaps a co-processor 905) coupled with bus 902 for processing information. Computer system 900 may also include a main memory 906, such as a random access memory ("RAM") or any other suitable dynamic storage device coupled to bus 902 for storing information and instructions to be executed by processor 904. Main memory 906 also may be used for storing temporary variables or other intermediate information during execution of instructions to be executed by processor 904. Computer system 900 further includes a read only memory ("ROM") 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 or other connection to a display system 912, such as a cathode ray tube ("CRT"), flat panel display or touch panel display configured and adapted for displaying information to a user of computing system 900. An input device 914, including alphanumeric and other keys, is coupled to bus 902 for communicating information and command selections to processor 904. Another type of user input device may be used, including cursor control 916, such as a mouse, a trackball, or cursor direction keys for communicating direction information and command selections to processor 904 and for controlling cursor movement on display 912. This input device typically has two degrees of freedom in two axes allowing the device to specify positions in a plane. A touch panel display may also be used as an input device. User input and output may be provided remotely using a network, whether wired or wireless.

According to one embodiment of the invention, portions of the scanner tuning process, for example, simulation operations, may be performed by computer system 900 in response to processor 904 executing one or more sequences of one or more instructions contained in main memory 906. Such instructions may be read into main memory 906 from another computer-readable medium, such as storage device 910.

Execution of the sequences of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media include, for example, optical or magnetic disks, such as storage device 910 and may be provided locally with respect to the processor 904 or remotely, connected by network. Non-volatile storage may be removable from computing system 904, as in the example of Blu-Ray, DVD or CD storage or memory cards or sticks that can be easily connected or disconnected from a computer using a standard interface, including USB, etc.

Volatile media include dynamic memory, such as main memory 906. Transmission media include coaxial cables, copper wire and fiber optics, including the wires that comprise bus 902. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, Blu-Ray, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be borne on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also preferably includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider ("ISP") 926. ISP 926 in turn provides data communication services through the worldwide packet data communication network, now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920, and communication interface 918. In the Internet example, a server 930 might transmit a requested code for an application program through Internet 928, ISP 926, local network 922 and communication interface 918. In accordance with the invention, one such downloaded application provides for the scanner simulation of the embodiment, for example. The received code may be executed by processor 904 as it is received, and/or stored in storage device 910, or other non-volatile storage for later execution. In this manner, computer system 900 may obtain application code in the form of a carrier wave.

Figure 10:
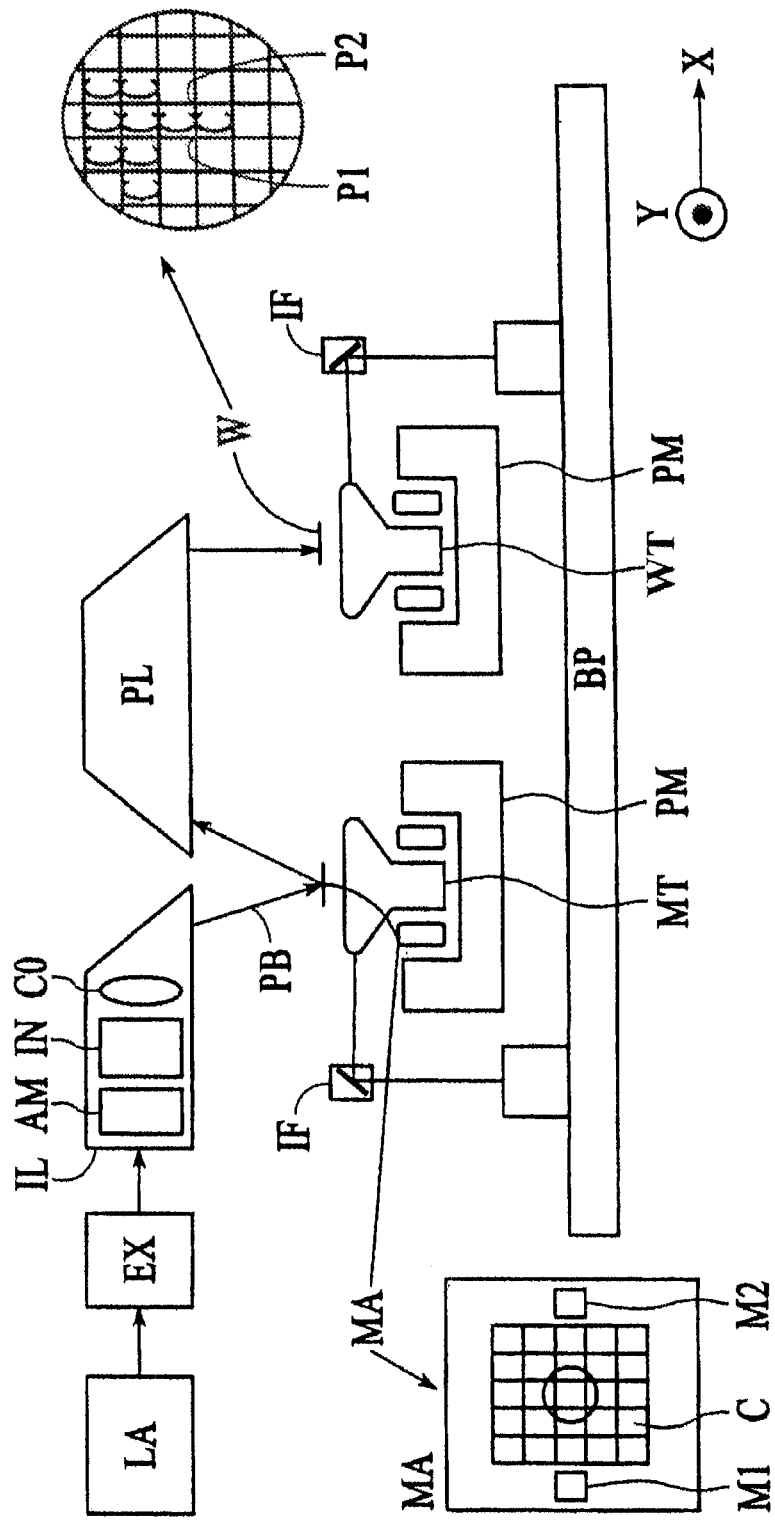
FIG. 10 schematically depicts a lithographic projection apparatus according to certain aspects of the present invention.

FIG. 10 schematically depicts one example of lithographic projection apparatus that may benefit from tuning by processes provided according to certain aspects of the present invention. The apparatus comprises:

- a radiation system Ex, IL, for supplying a projection beam PB of radiation. In the example, the radiation system also comprises a radiation source LA;
- a first object table—or mask table MT—provided with a mask holder for holding a mask MA, such as a reticle, and connected to first positioning means for accurately positioning the mask with respect to item PL;
- a second object table or substrate table WT provided with a substrate holder for holding a substrate W such as a resist coated silicon wafer, and connected to second positioning means for accurately positioning the substrate with respect to item PL;
- a projection system or "lens" PL, such as a refractive, catoptric or catadioptric optical system, for imaging an irradiated portion of the mask MA onto a target portion C e.g. comprising one or more dies of the substrate W.

As depicted in the example, the apparatus is of a reflective type, having a reflective mask. The apparatus may also be of a transmissive type, having a transmissive mask. Alternatively, the apparatus may employ another kind of patterning means as an alternative to the use of a mask; examples include a programmable mirror array or LCD matrix.

The source LA can be, for example, a mercury lamp or excimer laser or other device that produces a beam of radiation. This beam may be fed into an illumination system or illuminator ("IL"), either directly or after conditioning, having traversed conditioning means such as a beam expander "EX," for example. The illuminator IL may comprise adjusting means "AM" for setting the outer and/or inner radial extent (σ-outer and/or σ-inner, respectively) of the intensity distribution in the beam. Illuminator IL may also comprise various other components, such as an integrator IN and a condenser CO and the resultant beam PB can be caused to impinge on the mask MA with a desired uniformity and intensity distribution in its cross-section.

With regard to FIG. 10, source LA may be provided within the housing of the lithographic projection apparatus, particularly where, for example, the source LA includes a mercury lamp. Source LA may also be provided remote from the lithographic projection apparatus, the radiation beam that it produces being led into the apparatus by light conductor, with the aid of suitable directing mirrors and/or lens, etc. In one example, a source LA that includes an excimer laser based on KrF, ArF or F2 lasing, for example, may be located at some distance from the projection apparatus.

In the depicted example, beam PB may subsequently intercept mask MA, which is held on a mask table MT. Having traversed the mask MA, the beam PB passes through the lens PL, which focuses the beam PB onto a target portion C of the substrate W. With the aid of the second positioning means and/or interferometric measuring means IF, the substrate table WT can be moved with precision in order to position different target portions C in the path of the beam PB. Similarly, the first positioning means can be used to accurately position the mask MA with respect to the path of the beam PB, typically after mechanical retrieval of the mask MA from a mask library, or during a scan. In general, movement of the object tables MT, WT can be realized with the aid of a long-stroke module or coarse positioning system and a short-stroke module or fine positioning system, which is not explicitly depicted in FIG. 10. However, in the case of a wafer stepper, the mask table MT may be connected solely to a short stroke actuator or may be fixed. Patterning device MA and substrate W may be aligned using alignment marks M1, M2 in the patterning device, and alignment marks P1, P2 on the wafer, as required. Additionally, a baseplate BP may provide structural support to the system.

The system depicted in the example can be used in different modes:

- In step mode, the mask table MT is maintained substantially stationary and an entire mask image is projected in one step—i.e., a single flash—onto a target portion C. The substrate table WT can then be shifted in the x and/or y directions so that a different target portion C can be irradiated by the beam PB;
- In scan mode, essentially the same scenario applies, except that a given target portion C is not exposed in a single flash but the mask table MT is movable in a given, so called, scan direction (e.g., the y direction) with a speed v, so that the projection beam PB is caused to scan over a mask image; the substrate table WT can be simultaneously moved in the same or opposite direction at a speed V=Mv, in which M is the magnification of the lens PL; typically, M=¼ or ⅕. In this manner, a relatively large target portion C can be exposed while maintaining system resolution.

Systems and methods provided in accordance with certain aspects of the invention can simulate or mathematically model any generic imaging system for imaging sub wavelength features, and it is contemplated that the systems and methods may be advantageously used with emerging imaging technologies capable of producing wavelengths of an increasingly smaller size. Emerging technologies already in use include extreme ultra violet ("EUV") lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by impacting a solid or plasma material with high energy electrons in order to produce photons within this range. Because most materials are absorptive within this range, illumination may be produced by reflective mirrors with a multi-stack of Molybdenum and Silicon. The multi-stack mirror can have 40 layer pairs of Molybdenum and Silicon where the thickness of each layer is a quarter wavelength. Even smaller wavelengths may be produced with X-ray lithography. Typically, a synchrotron is used to produce an x-ray wavelength. Since most material is absorptive at x-ray wavelengths, a thin piece of absorbing material defines where features print or do not print according to whether a positive or negative resist, respectively, is used.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

Additional Descriptions of Certain Aspects of the Invention

Certain embodiments of the invention provide systems and methods for system level matching of scanners. Some of these embodiments comprise steps of maintaining a reference model identifying sensitivity of a reference scanner to a set of tunable parameters, generating a differential model for a target scanner, the differential model providing mappings between the reference model and a target model identifying sensitivities of the target scanner, and tuning the target scanner based on the differential model and the reference model.

In some of these embodiments a combination of tuning and calibration information is used during simulation. In some of these embodiments, tuning and calibration information is expressed as a differential model characterizing the differences in imaging performance between a selected scanner and a reference scanner, whereby the reference scanner models the performance of an ideal scanner or a typical scanner. In some of these embodiments, an ideal scanner is created. In some of these embodiments, the ideal scanner is initially based on the design requirements of a scanner. In some of these embodiments, the ideal scanner performs at specified nominal values.

In some of these embodiments, a reference model is altered to reflect real-world performance of one or more scanners. In some of these embodiments, observed deviations from nominal values are added to the model. In some of these embodiments, operating environment of the scanner, type of materials used in chip manufacture and other factors are characterized for a plurality of scanners. In some of these embodiments, the reference model is adjusted based on deviations attributable to operating environment.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method implemented by a computer, the method being for tuning a lithographic apparatus using a corresponding differential model that predicts changes in imaging behavior due to changes between two or more lithographic apparatuses, the method comprising:
   maintaining a lithographic process model characterizing imaging behavior of a lithographic process for a given layer of a wafer using one of the lithographic apparatuses, given particular values for a set of tunable parameters on the one lithographic apparatus;
   generating a simulated wafer contour in the given layer using a design layout and the lithographic process model based on the particular values of the set of tunable parameters;
   identifying discrepancies in the simulated wafer contour against a reference corresponding to the particular values of the set of tunable parameters and a different one of the lithographic apparatuses;
   quantifying the discrepancies with a cost function; and
   performing iterations of the generating and identifying steps to minimize the cost function and obtain calibrated parameters of the differential model, wherein each iteration uses a different reference corresponding to a different one of the lithographic apparatuses,
   wherein one or more of the maintaining, generating, identifying, quantifying and performing steps are implemented by the computer.

2. The method of claim 1, further comprising calculating, using the differential model, tuning offsets for one of the lithographic apparatuses different than the one lithographic apparatus to bring critical dimensions for certain patterns in the design layout within predefined tolerances.

3. The method of claim 1, wherein the reference is a measured wafer contour from a reference lithographic process different from the lithographic process, for a set of patterns in the design layout.

4. The method of claim 1, wherein the reference is a different simulated wafer contour from a reference lithographic process model different from the lithographic process model, for a set of patterns in the design layout.

5. The method of claim 1, wherein the reference comprises design target polygons for a set of patterns in the design layout.

6. The method of claim 1, wherein the discrepancies in the simulated wafer contour against the reference are obtained via an Optical Proximity Correction ("OPC") verification tool.

7. The method of claim 6, wherein the step of identifying discrepancies includes identifying hotspots.

8. The method of claim 7, wherein the hotspots include yield-limiting defects occurring under process variations.

9. The method of claim 7, wherein the hotspots include patterns in the design layout that are adversely affected by characteristics specific to the lithographic apparatus.

10. The method of claim 1, wherein the cost function comprises imaging metric terms associated with a tuning target pattern set.

11. The method of claim 1, wherein the discrepancies in wafer contours result from differences in one or more of optics, mechanics, control and device-specific laser differences of the lithographic apparatus.

12. The method of claim 1, wherein the discrepancies in wafer contours result from differences in one or more of mask, resist, track, and etch differences of the lithographic process.

13. The method of claim 1, wherein the steps of generating, identifying and calculating are repeated until a plurality of hotspots are eliminated.

14. A non-transitory computer readable storage medium having instructions stored thereon, which when executed by a computer, cause the computer to implement a method, the method being for tuning a lithographic apparatus using a corresponding differential model that predicts changes in imaging behavior due to changes between two or more lithographic apparatuses, the method comprising:
   maintaining a lithographic process model characterizing imaging behavior of a lithographic process for a given layer of a wafer using one of the lithographic apparatuses, given particular values for a set of tunable parameters on the one lithographic apparatus;

generating a simulated wafer contour in the given layer using a design layout and the lithographic process model based on the particular values of the set of tunable parameters;

identifying discrepancies in the simulated wafer contour against a reference corresponding to the particular values of the set of tunable parameters and a different one of the lithographic apparatuses;

quantifying the discrepancies with a cost function; and performing iterations of the generating and identifying steps to minimize the cost function and obtain calibrated parameters of the differential model, wherein each iteration uses a different reference corresponding to a different one of the lithographic apparatuses, wherein one or more of the maintaining, generating, identifying, quantifying and performing steps are implemented by the computer.

15. The non-transitory computer readable storage medium of claim 14, the method further comprising calculating, using the differential model, tuning offsets for one of the lithographic apparatuses different than the one lithographic apparatus to bring critical dimensions for certain patterns in the design layout within predefined tolerances.

16. The non-transitory computer readable storage medium of claim 14, wherein the reference is a measured wafer contour from a reference lithographic process different from the lithographic process, for a set of patterns in the design layout.

17. The non-transitory computer readable storage medium of claim 14, wherein the reference is a different simulated wafer contour from a reference lithographic process model different from the lithographic process model, for a set of patterns in the design layout.

18. The non-transitory computer readable storage medium of claim 14, wherein the reference comprises design target polygons for a set of patterns in the design layout.

19. The non-transitory computer readable storage medium of claim 14, wherein the discrepancies in the simulated wafer contour against the reference are obtained via an Optical Proximity Correction ("OPC") verification tool.

20. The non-transitory computer readable storage medium of claim 19, wherein the step of identifying discrepancies includes identifying hotspots.

21. The non-transitory computer readable storage medium of claim 20, wherein the hotspots include yield-limiting defects occurring under process variations.

22. The non-transitory computer readable storage medium of claim 20, wherein the hotspots include patterns in the design layout that are adversely affected by characteristics specific to the lithographic apparatus.

23. The non-transitory computer readable storage medium of claim 14, wherein the cost function comprises imaging metric terms associated with a tuning target pattern set.

24. The non-transitory computer readable storage medium of claim 14, wherein the discrepancies in wafer contours result from differences in one or more of optics, mechanics, control and device-specific laser differences of the lithographic apparatus.

25. The non-transitory computer readable storage medium of claim 14, wherein the discrepancies in wafer contours result from differences in one or more of mask, resist, track, and etch differences of the lithographic process.

26. The non-transitory computer readable storage medium of claim 14, wherein the steps of generating, identifying and calculating are repeated until a plurality of hotspots are eliminated.

* * * * *

UNITED STATES PATENT AND TRADEMARK OFFICE
CERTIFICATE OF CORRECTION

PATENT NO. : 8,874,423 B2  
APPLICATION NO. : 14/064917  
DATED : October 28, 2014  
INVENTOR(S) : Yu Cao et al.

Page 1 of 1

It is certified that error appears in the above-identified patent and that said Letters Patent is hereby corrected as shown below:

On title page, item (75) Inventors, Line 4
replace "Los Altos, AZ"
with --Los Altos, CA--.

Signed and Sealed this
Twenty-fourth Day of February, 2015

Michelle K. Lee
*Deputy Director of the United States Patent and Trademark Office*